United States Patent
Brabec et al.

(10) Patent No.: US 7,898,728 B2
(45) Date of Patent: Mar. 1, 2011

(54) METHOD FOR PRODUCING AN ELECTROCHROMIC DISPLAY

(75) Inventors: Christoph Brabec, Linz (AT); Jens Hauch, Heroldsberg (DE)

(73) Assignee: Siemens Aktiengesellschaft, Munich (DE)

( * ) Notice: Subject to any disclaimer, the term of this patent is extended or adjusted under 35 U.S.C. 154(b) by 469 days.

(21) Appl. No.: 12/063,137

(22) PCT Filed: Aug. 4, 2006

(86) PCT No.: PCT/EP2006/065069

§ 371 (c)(1),
(2), (4) Date: Mar. 27, 2008

(87) PCT Pub. No.: WO2007/017472

PCT Pub. Date: Feb. 15, 2007

(65) Prior Publication Data

US 2010/0157409 A1    Jun. 24, 2010

(51) Int. Cl.
*G02B 26/00* (2006.01)
(52) U.S. Cl. ..................... 359/297; 359/290
(58) Field of Classification Search .......... 359/265, 359/266, 267, 269, 270, 273, 275
See application file for complete search history.

(56) References Cited

U.S. PATENT DOCUMENTS

| 5,225,582 | A | * | 7/1993 | Mason ................ 556/423 |
|---|---|---|---|---|
| 5,500,759 | A | * | 3/1996 | Coleman ............. 359/270 |
| 5,742,424 | A | | 4/1998 | Coleman ............. 359/273 |
| 6,294,111 | B1 | | 9/2001 | Shacklett, III et al. ... 252/518.1 |
| 6,336,753 | B1 | * | 1/2002 | Kihira et al. ......... 396/506 |
| 6,437,901 | B1 | * | 8/2002 | Kobayashi et al. ..... 359/267 |
| 6,753,995 | B2 | * | 6/2004 | Wang ................ 359/271 |
| 6,867,894 | B2 | * | 3/2005 | Asano et al. ......... 359/272 |
| 7,307,772 | B2 | * | 12/2007 | Garg et al. .......... 359/265 |
| 2003/0179432 | A1 | | 9/2003 | Vincent et al. ....... 359/265 |

FOREIGN PATENT DOCUMENTS

| EP | 1424590 | 6/2002 |
|---|---|---|
| WO | 02/075441 | 9/2002 |
| WO | 02/075442 | 9/2002 |
| WO | 2006/051045 | 5/2006 |

OTHER PUBLICATIONS

International Search Report for Application No. PCT/EP2006/065069 (4 pages).

* cited by examiner

*Primary Examiner*—Timothy J Thompson
(74) *Attorney, Agent, or Firm*—King & Spalding L.L.P.

(57) ABSTRACT

In a method for producing electrochromic displays (1, 10) the functional layers, such as the electrodes (3, 4, 6) and electrochromic layer (5) are configured in a printing process. The method enables a particularly cost-effective and flexible production of the display.

24 Claims, 1 Drawing Sheet

METHOD FOR PRODUCING AN ELECTROCHROMIC DISPLAY

CROSS-REFERENCE TO RELATED APPLICATIONS

This application is a U.S. national stage application of International Application No. PCT/EP2006/065069 filed Aug. 4, 2006, which designates the United States of America, and claims priority to German application number 10 2005 037 359.3 filed Aug. 8, 2005, the contents of which are hereby incorporated by reference in their entirety.

TECHNICAL FIELD

The present invention relates to a method for producing electrochromic displays having several functional layers.

BACKGROUND

In general, electrochromic displays are made up of a system comprising a plurality of functional layers. In such displays, the actual electrochromic or coloring layer can consist, for example, of three layers: an ion storage and ion-conducting layer, an electrolyte layer and a layer comprising the actual electrochromic material.

Known electrochromic materials are, for example, PEDOT: PSS (poly(3,4-ethylenedioxythiophene) with PSS (polystyrene sulfonate) providing the counter-ion, or PANI (polyaniline). These materials change color as the result of oxidation or reduction. In electrochromic displays, a controlled reduction or oxidation is achieved by applying a voltage across the electrochromic and ion storage layer. For this reason two electrode layers further need to be provided, between which the color system comprising the electrochromic layer and the ion storage and ion-conducting layer and the electrolyte is provided. More recently, materials that combine the functions of the electrolyte and color system in a single electrochromic layer have also been developed.

The manufacture of an electrochromic display therefore requires manufacturing three layers arranged one on top of another. At least one of the electrode layers must additionally have a transparency of at least about 80% in the visible spectrum so that the color change in the electrochromic layer is visible when voltages are applied and a useable form of display is thus created.

A suitable material has proved to be indium tin oxide (ITO), which is semi-conductive and transparent. Sufficient conductivity is achieved by doping. A transparent electrode layer is then formed by sputtering ITO mixed oxide onto glass or clear transparent film. This transparent layer, which is used as a visible electrode, is then coated with the electrochromic layer and a second electrode by further processes. In the manufacture of the various functional layers, it is particularly disadvantageous to have to combine different process technologies, such as the sputtering of the ITO layer, for example, with printing or gluing processes because this interrupts the production flow.

SUMMARY

A simple, uniform production method for electrochromic displays can be provided according to an embodiment by a method for producing an electrochromic display comprising the method steps: a) Applying a first fluid comprising conductive particles to a substrate by means of a printing process to form a first electrode layer; b) Applying a second fluid comprising an electrochromic material onto the first electrode layer by means of a printing process to form an electrochromic layer; and c) Applying a third fluid comprising conductive particles to the electrochromic layer by means of a printing process to form a second electrode layer.

According to a further embodiment, at least one of the fluids may be a suspension or solution. According to a further embodiment, the first or the third fluid may be indium tin oxide in a transparent or semi-transparent suspension medium. According to a further embodiment, the first and/or the third fluid may comprise silver and/or gold particles. According to a further embodiment, the first and/or the third fluid can be a conductive polymer, in particular PEDOT or PANI. According to a further embodiment, before and/or after the application of the second fluid, at least one further electrode layer may be printed, the first and/or the second electrode layer having a higher conductivity than the further electrode layer. According to a further embodiment, the further electrode layer may comprise carbon particles. According to a further embodiment, the printing methods may be screen printing, offset printing and/or gravure printing. According to a further embodiment, after at least one of the steps for applying a layer by means of a printing process, hardening the respective layer that has been formed, by means of evaporation, irradiation with heat, irradiation with UV light or a chemical reaction. According to a further embodiment, at least one fluid may have cross-linkable polymers, which cross-link through irradiation with UV and form a printable layer. According to a further embodiment, the display is sealed with a sealing layer. According to a further embodiment, the substrate may be transparent or partially transparent. According to a further embodiment, the electrode layers each may have a thickness in a region between 1 μm and 10 μm, preferably about 5 μm. According to a further embodiment, the electrochromic layer may have a thickness in a region between 10 μm and 200 μm, preferably about 50 μm.

According to another embodiment, an electrochromic display may comprise a substrate of a printed semi-transparent visible electrode layer, a printed electrochromic layer, and a printed electrode layer, the layers being disposed one on top of the other.

According to a further embodiment, a further printed electrode layer having a lower conductivity than the first and/or the second electrode layer may be provided. According to a further embodiment, the substrate can be transparent or partially transparent. According to a further embodiment, the electrode layers each may have a thickness in a region between 1 μm and 10 μm, preferably about 5 μm. According to a further embodiment, the electrochromic layer may have a thickness in a region between 10 μm and 200 μm, preferably about 50 μm.

BRIEF DESCRIPTION OF THE DRAWINGS

Preferred exemplary embodiments of the invention are described hereinafter in more detail with FIG. 1.

DETAILED DESCRIPTION

Figure 1A:
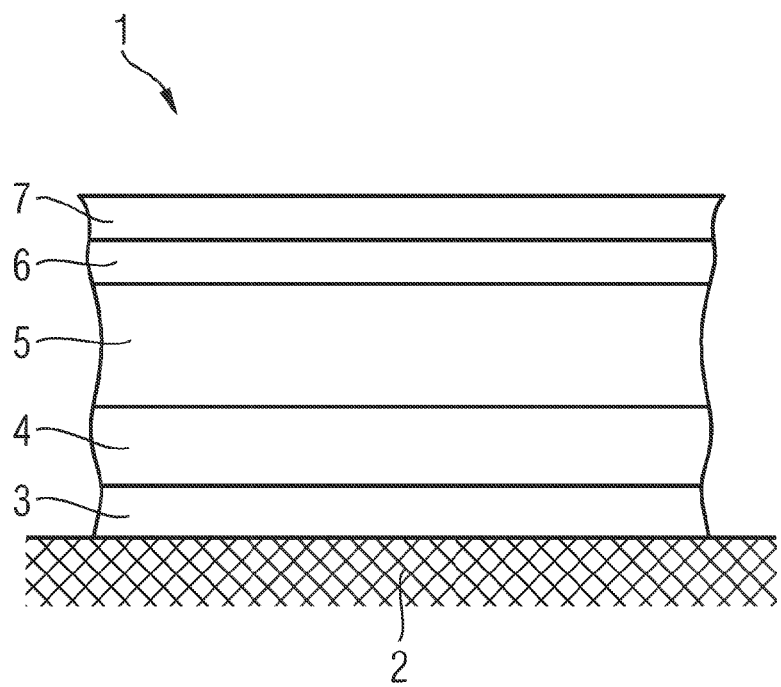
FIGS. 1(A) and (B) show an electrochromic display manufactured according to an embodiment.

According to an embodiment, the following method steps are provided for the manufacture of an electrochromic display:

a) Applying a first fluid comprising conductive particles onto a substrate by means of a printing process to form a first electrode layer;

b) Applying a second fluid comprising an electrochromic material onto the first electrode layer by means of a printing process to form an electrochromic layer;

c) Applying a third fluid comprising conductive particles to the electrochromic layer by means of a printing process to form a second electrode layer.

An electrochromic display according to an embodiment, thus, has a substrate, a printed semi-transparent visible electrode, a printed electrochromic layer and a printed electrode layer, the layers being arranged one on top of the other.

According to an embodiment, all the functional layers are formed using printing technology processes. With what are generally very flexible substrates, this results in a very cost-effective manufacture of the electrochromic display. Simple structuring of the various layers using printing processes allows production from roll to roll and can thus be used for the production of "electronic paper".

The first and/or third fluid preferably comprises indium tin oxide in a transparent suspension medium or a conductive polymer, such as, for example, PEDOT or PANI. The first or third fluid preferably comprises silver or gold particles. In a preferred embodiment, a further electrode layer is printed between the electrochromic layer and the first and/or second electrode layer, said layer preferably comprising carbon particles. The substrate is preferably transparent or partially transparent. A transparency is then desired such that color changes in the electrochromic layer can be perceived though the substrate. The fluids should preferably be in suspension or solution.

The preferred printing processes used to form the functional layers are screen printing, offset printing or gravure printing.

According to a further embodiment, there is after at least one of the layer-application steps by means of a printing process, a method step to harden the respective layer that has been formed, by means of evaporation, irradiation with heat, irradiation with UV light or a chemical reaction.

A fluid then preferably comprises cross-linkable polymers, which cross-link as a result of UV irradiation and form a printable layer.

The electrode layers preferably have a thickness of between 1 μm and 10 μm and the electrochromic layer preferably has a thickness of between 10 μm and 200 μm.

Further advantageous embodiments and developments are disclosed in the further description with reference to the drawing.

FIG. 1(A) shows a fully printed electrochromic display 1. A first electrode 3 comprised of a silver screen-printing paste is printed onto a substrate 2, comprising for example PET (polyethylene terephthalate), and after drying, a second screen-printing paste comprising carbon nanoparticles, which forms a second electrode layer 4, is printed onto said first electrode 3.

An electrochromic material is printed onto the second electrode layer 4, by means of screen-printing for example, in order to form the electrochromic layer 5. The Dow Chemicals company supplies, for example, a screen-printable electrochromic ink under the brand name READ. These READ inks comprise ion-conductive polymers in which a redox group and an ink are directly coupled to an electrolyte molecule.

A semi-transparent visible electrode 6 is applied onto the electrochromic layer 5, in which process, for example, an appropriate screen-printing paste will comprise a transparent suspension medium and indium tin oxide particles. Finally, a sealing layer 7 is applied onto said semi-transparent visible electrode 6.

By applying a voltage between the silver electrode layer 3 and the semi-transparent visible electrode 6, the oxidation in the electrochromic material of the electrochromic layer 5 is controlled and the optical properties of this layer arrangement are changed. The carbon electrode layer 4 essentially has the function here of protecting the silver in the first electrode layer 3 against chemical reactions with the electrochromic layer 5.

In printing pastes for consecutive printing processes, that is, directly adjacent, functional layers, it is preferable to use orthogonal suspension media or solvents. Thus, for example, the silver screen printing paste used for the first electrode layer 3 can contain a polar suspension medium, whilst the subsequent carbon printing paste for the second electrode layer 4 is based on non-polar suspension media. The materials in the printing pastes are selected in such a way that, in the dried state, a sufficiently high mechanical stability is created for a further functional layer to be printed thereon. In order to further increase the speed of production for a display according to an embodiment it is also possible to use solvents or suspension media that harden as the result of UV-irradiation. For example, materials containing monomers and/or polymers and appropriate photo-initiators could be mentioned here. Polymerization is then set in motion by means of UV-irradiation. Thus an accelerated sequence of the method steps can be achieved compared with the traditional practice of leaving the printed layer to dry.

The electrochromic display shown in FIG. 1(A) has a clear seal 7 such that a non-transparent substrate 2 can be used.

Figure 1B:
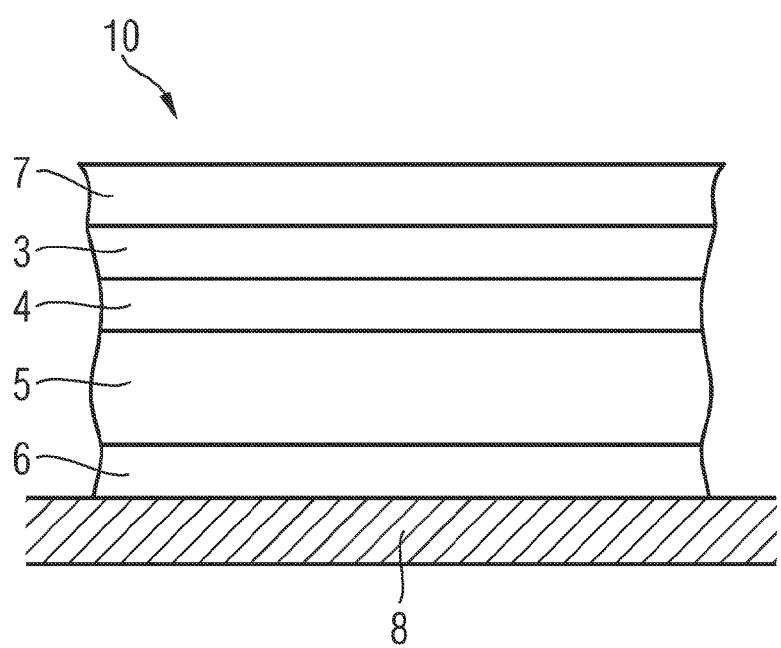

FIG. 1(B) shows an electrochromic display 10 with an alternative sequence of the functional layers 3-7.

First a semi-permeable or transparent substrate 8 is provided, onto which a suspension comprising ITO is printed. Thus, after drying, a transparent or semi-transparent electrode layer 6, which functions as a visible electrode, is created. Onto this a suspension comprising electrochromic material, READ material, for example, is printed, again using printing technology. A carbon screen-printing paste, optionally in a structured form, is printed onto said electrochromic layer 5 by means of screen-printing. A suspension comprising silver or gold nanoparticles, for example, is then printed onto this carbon electrode 4 in order to obtain a particularly good conductivity of said second electrode layer 3.

Finally, the succession of layers consisting of the transparent electrode layer 6, the electrochromic layer 5, the carbon electrode layer 4, and the silver or gold electrode layer 3 are sealed with an appropriate material 7. This can be achieved by lamination with a plastic or by a further printing process.

The method according to an embodiment for the production of said electrochromic displays 1, 10, which are shown by way of example, is based exclusively on printing processes. A particularly simple structuring of the functional layers 3-6 is therefore possible. Furthermore, the application of all the layers by means of printing technology processes, such as screen printing, gravure, offset printing or flexography, allows the processing of large areas of electrochromic displays from roll to roll in a printing works process.

If the electrode layers have a thickness of about 10 μm and the electrochromic layer has a thickness of about 50 μm, this substrate thickness and seal result in a flexible electrochromic display arrangement.

The indium tin oxide suspension referred to herein for printing the transparent electrolyte layer should be understood merely as an example. In particular, conductive polymers, such as PEDOT or PANI, for example, can also be applied to the corresponding electrochromic layer as a transparent electrode layer.

What is claimed is:

1. A method for producing an electrochromic display comprising the method steps:

applying a first fluid comprising conductive particles to a substrate by means of a printing process to form a first electrode layer;

applying a second fluid comprising an electrochromic material over the second electrode layer by means of a printing process to form an electrochromic layer;

applying a third fluid comprising conductive particles over the electrochromic layer by means of a printing process to form a second electrode layer; and printing a further electrode layer, the further electrode layer located between the first electrode layer and the electrochromic layer or between the second electrode layer and the electrochromic layer;

wherein at least one of the first and second electrode layers has a higher conductivity than the further electrode layer.

2. The method according to claim 1, wherein at least one of the fluids is a suspension or solution.

3. The method according to claim 1, wherein the first or the third fluid is indium tin oxide in a transparent or semi-transparent suspension medium.

4. The method according to claim 1, wherein the first and/or the third fluid comprises silver and/or gold particles.

5. The method according to claim 1, wherein the first and/or the third fluid is a conductive polymer, in particular PEDOT or PANI.

6. The method according to claim 1, wherein the further electrode layer comprises carbon particles.

7. The method according to claim 1, wherein the printing methods are screen printing, offset printing and/or gravure printing.

8. The method according to claim 1, wherein after at least one of the steps for applying a layer by means of a printing process, there is a method step for hardening the respective layer that has been formed, by means of evaporation, irradiation with heat, irradiation with UV light or a chemical reaction.

9. The method according to claim 8, wherein at least one fluid has cross-linkable polymers, which cross-link through irradiation with UV and form a printable layer.

10. The method according to claim 1, wherein the display is sealed with a sealing layer.

11. An electrochromic display comprising:
a substrate,
a first printed electrode layer comprising a semi-transparent visible electrode layer,
a printed electrochromic layer,
a second printed electrode layer, and
a third printed electrode layer having a lower conductivity than at least one of the first and second electrode layers, the third electrode layer located between the first electrode layer and the electrochromic layer or between the electrochromic layer and the second electrode layer.

12. The electrochromic display according to claim 11, wherein the substrate is transparent or partially transparent.

13. The electrochromic display according to claim 11, wherein the electrode layers each have a thickness in a region between 1 μm and 10 μm.

14. The electrochromic display according to claim 11, wherein the electrochromic layer has a thickness in a region between 10 μm and 200 μm.

15. The electrochromic display according to claim 11, wherein the electrode layers each have a thickness in a region about 5 μm.

16. The electrochromic display according to claim 11, wherein the electrochromic layer has a thickness in a region about 50 μm.

17. The method according to claim 1, wherein the substrate is transparent or partially transparent.

18. The method according to claim 1, wherein the electrode layers each have a thickness in a region between 1 μm and 10 μm.

19. The method according to claim 1, wherein the electrochromic layer has a thickness in a region between 10 μm and 200 μm.

20. The method according to claim 1, wherein the further electrode layer is formed before the electrochromic layer such that the further electrode layer is located between the first electrode layer and the electrochromic layer.

21. The method according to claim 1, wherein the further electrode layer is formed after the electrochromic layer such that the further electrode layer is located between the electrochromic layer and the second electrode layer.

22. A method for producing an electrochromic display, comprising:

applying a first fluid comprising conductive particles to a substrate by means of a printing process to form a first electrode layer;

applying a second fluid comprising an electrochromic material over the first electrode layer by means of a printing process to form an electrochromic layer; and applying a third fluid comprising conductive particles over the electrochromic layer by means of a printing process to form a second electrode layer;

wherein at least one of the first electrode layer, the electrochromic layer, and the second electrode layer comprises cross-linkable polymers; and wherein at least one of the layers comprises cross-linkable polymers is hardened to form a printable layer by irradiating the at least one layer with UV light to cause cross-linking of the cross-linkable polymers of the at least one layer.

23. A method for producing an electrochromic display, comprising:

applying a first fluid comprising conductive particles to a substrate by means of a printing process to form a first electrode layer;

applying a second fluid comprising an electrochromic material over the first electrode layer by means of a printing process to form an electrochromic layer; and applying a third fluid comprising conductive particles over the electrochromic layer by means of a printing process to form a second electrode layer;

wherein at least one of the first and third fluids comprises a conductive polymer.

24. The method according to claim 23, wherein at least one of the first and third fluids comprises PEDOT or PANI.

* * * * *

UNITED STATES PATENT AND TRADEMARK OFFICE
CERTIFICATE OF CORRECTION

PATENT NO. : 7,898,728 B2
APPLICATION NO. : 12/063137
DATED : March 1, 2011
INVENTOR(S) : Christoph Brabec et al.

It is certified that error appears in the above-identified patent and that said Letters Patent is hereby corrected as shown below:

Title page, Please insert --(30) Foreign Application Priority Data

August 8, 2005..............(DE) ............... 10 2005 037 359.3--.

Signed and Sealed this
Third Day of May, 2011

David J. Kappos
*Director of the United States Patent and Trademark Office*